(No Model.)

E. J. COOK & W. McEWEN.
METHOD OF AND APPARATUS FOR PURIFYING LIQUIDS.

No. 593,371. Patented Nov. 9, 1897.

Witnesses
G. M. Gridley
Chas. J. Welch

Inventors
Edward J. Cook
William McEwen
By their Attorney
Paul A. Staley

THE NORRIS PETERS CO., PHOTO-LITHO., WASHINGTON, D. C.

UNITED STATES PATENT OFFICE.

EDWARD J. COOK AND WILLIAM McEWEN, OF CLEVELAND, OHIO.

METHOD OF AND APPARATUS FOR PURIFYING LIQUIDS.

SPECIFICATION forming part of Letters Patent No. 593,371, dated November 9, 1897.

Application filed July 16, 1897. Serial No. 644,828. (No model.)

*To all whom it may concern:*

Be it known that we, EDWARD J. COOK and WILLIAM McEWEN, citizens of the United States, residing at Cleveland, in the county of Cuyahoga and State of Ohio, have invented certain new and useful Improvements in Methods of and Apparatus for Purifying Liquids, of which the following is a specification.

Our invention relates to improvements in the method of and apparatus for purifying water and other liquids.

The object of our invention is to provide a process and apparatus by means of which oil, grease, and other impurities contained in water or other liquids can be separated or removed, the invention being especially adapted for removing oil or grease from the water of condensation from steam-engines and similar devices, though it is by no means limited to this use, but is capable of various other uses to which it may readily be adapted.

Figure 2:
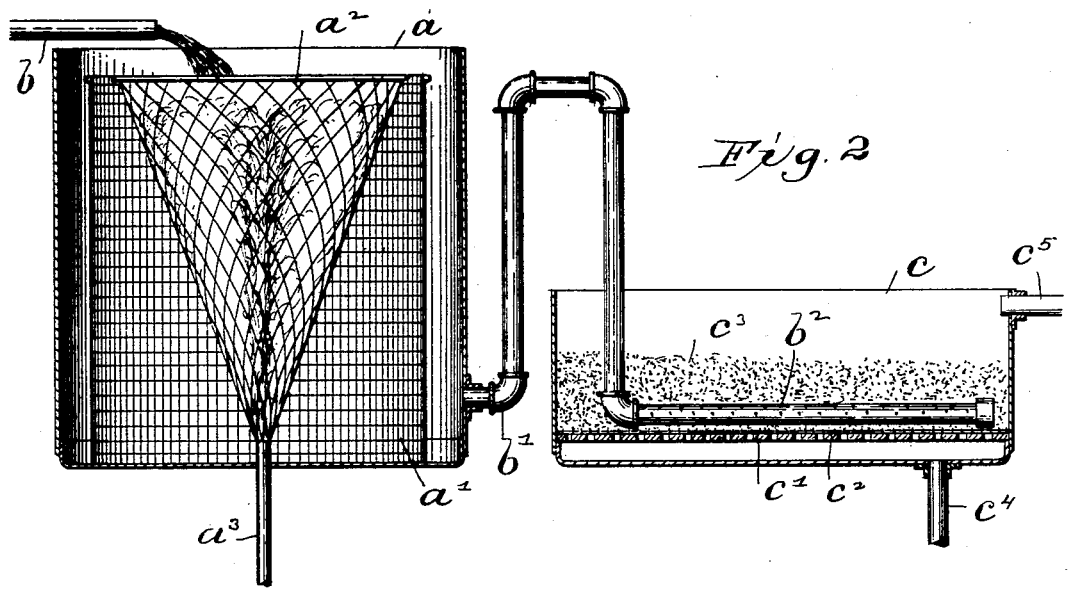
Figure 1:
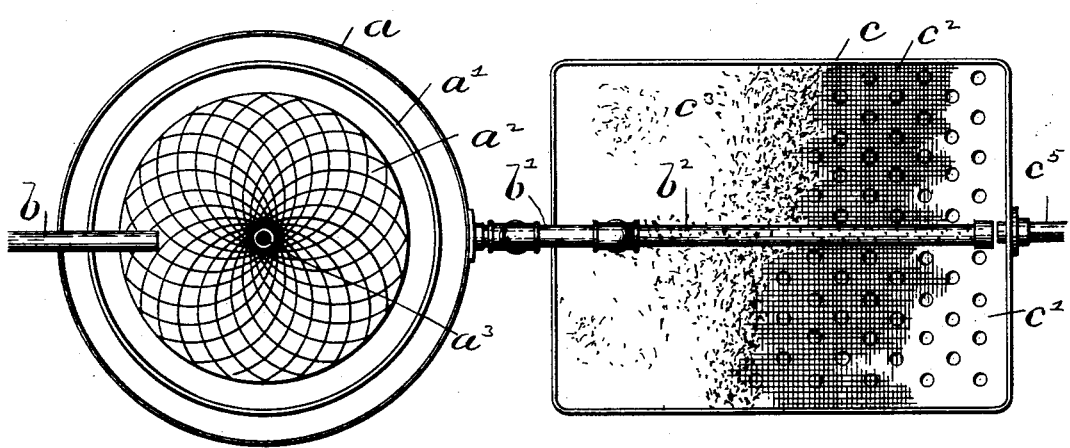

In the accompanying drawings, Figure 1 is a plan view of a device adapted to carry out our improved method. Fig. 2 is a longitudinal sectional view of the same.

Like parts are represented by similar letters of reference in both views.

In carrying out our improved method we employ a tank or other suitable receptacle into which the water or other liquid containing the impurities to be separated or removed is conveyed. Within this tank and mixed with the liquid and impurities therein we introduce a fibrous substance, preferably asbestos fiber, finely subdivided. The water and impurities contained therein is then agitated in the tank by means of an air-blast, which is introduced, preferably, from the bottom and which stirs up the water and impurities and thoroughly mixes the fiber therewith. The fiber absorbs the oil or grease or other impurities, and means are then provided for separating the fiber from the water by straining or filtration, the water or other liquid being thus thoroughly purified and the oil, grease, or other impurities retained by the fiber.

In the said drawings, $a$ represents a tank of any suitable size and shape, the tank employed in the apparatus as illustrated being shown circular, which is the preferable construction. Within this tank we place a circular screen $a'$ of smaller diameter than the tank and preferably extending from a point near the top to the bottom thereof. This screen may be made of any suitable material, but we preferably form it of commercial tinned screen-wire of about thirty mesh. Within this cylindrical screen we place a second conical screen $a^2$, which extends from near the top of the tank to the bottom, with the apex of the cone at the bottom, and at this point—that is to say, the apex of the cone—we introduce a pipe $a^3$ through the bottom of the tank and projecting slightly within the conical screen $a^2$.

The water containing the oil, grease, or other foreign substance to be removed is introduced into the tank through an inlet-pipe $b$, which is projected sufficiently to allow the water to be discharged within the conical screen. The water escapes from the tank through a pipe $b'$, which preferably leads from a point near the bottom of the tank and is extended upwardly and thence downwardly, so as to maintain the water at a uniform level within the tank. The pipe $b'$ preferably joins a perforated pipe $b^2$, which is located within a filter $c$. This filter $c$ may be formed of any desirable or suitable construction. We have shown it provided with a perforated bottom $c'$, having thereon a screen $c^2$, and a filter-bed $c^3$, of any suitable granular material, into which the pipe $b^2$ is adapted to discharge. The filter $c$ is provided with a discharge-pipe $c^4$, which leads from below the perforated bottom $c'$, and is also provided with an overflow-pipe $c^5$, arranged above the filter-bed. This arrangement permits of cleaning the filter by backward filtration by forcing the water through the discharge-pipe $c^4$ and through the filter-bed and through the overflow-pipe $c^5$.

The operation of the device will be readily understood from the above. The water entering the pipe $b$ is discharged into the tank $a$ and fills the same. The asbestos fiber is introduced into the water in the tank and within the conical screen. Air or gas under pressure is admitted through the pipe $a^3$ and causes a circulation of the water in the tank, thoroughly commingling the asbestos fiber with the water. As the water continues to flow into the tank through the pipe $b$ it will overflow through the pipe $b'$ into the filter. The conical screen is made of coarser mesh than the cylindrical screen and retains the coarser particles of the asbestos fiber, which absorbs the oil and grease or other impurities and also certain organic substances which may be contained in the water. The finer particles of the asbestos fiber not retained by the conical screen $a^2$ will be collected by the screen $a'$, and the water will be finally purified by passing through the filter $c$.

The method of intimately mixing the asbestos fiber with the water containing any oil, grease, or other impurities and thoroughly commingling the same by agitation successfully removes all particles of oil or grease or other impurities from the water which contains the same. The purpose of the screens and filter is for removing all particles of the asbestos fiber.

While the improvements herein described are particularly adapted for separating oil or grease from water of condensation, it is by no means limited to this particular use, as we have found in practice that other impurities will be taken up by the asbestos and separated from the liquid. While we preferably use air for agitating the water being treated, it is obvious that fluids may be employed. Fluids having a specific gravity lighter than water are preferably employed, as they may be operated with less pressure, but the same or substantially the same result may be secured by a jet of water.

Having thus described our invention, we claim—

1. The method of purifying liquids which consists essentially in subjecting the same to agitation in the presence of a suitable fiber, and separating the fiber by straining or filtering, substantially as specified.

2. The method of purifying liquids which consists essentially in subjecting the same to agitation in the presence of asbestos fiber and removing the fiber therefrom by straining or filtering, substantially as specified.

3. The method of separating oil or similar substances from water which consists in introducing into said mixture of oil and water a suitable fiber contained within a screen, and agitating the same by means of a jet of air introduced into said screen, substantially as specified.

4. In an apparatus for purifying water, a tank, a screen within said tank, an air-jet introduced into said tank, and a suitable fiber contained within said tank, substantially as specified.

5. The combination with the tank, a cylindrical screen therein, an inner conical screen within said cylindrical screen, asbestos fiber within said conical screen, an air-pipe extending into said conical screen, and inlet and outlet pipes from said tank, substantially as and for the purpose specified.

6. The combination with a tank having a screen as described, a suitable fiber within said screen, and an air-blast introduced into said tank so as to agitate the water and fiber therein, outlet and inlet pipes for said tank, and a filter connected to the outlet-pipe, substantially as specified.

In testimony whereof we have hereunto set our hands this 8th day of July, A. D. 1897.

EDWARD J. COOK.
WILLIAM McEWEN.

Witnesses:
GEO. H. BOUTALL,
HARRY DIXON.